United States Patent [19]

Emile, Jr. et al.

[11] 4,386,308

[45] May 31, 1983

[54] HYSTERESIS TYPE BATTERY CHARGER HAVING OUTPUT SHORT CIRCUIT PROTECTION

[75] Inventors: Philip Emile, Jr., Roseland; James K. Kroeger, South Orange, both of N.J.

[73] Assignee: Sangamo Weston, Inc., Norcross, Ga.

[21] Appl. No.: 249,411

[22] Filed: Mar. 31, 1981

[51] Int. Cl.³ .............................................. H02J 7/10
[52] U.S. Cl. ...................................... 320/22; 307/48; 307/66; 320/48
[58] Field of Search ................... 320/35, 39, 43, 48, 320/22, 23; 307/48, 66

[56] References Cited

U.S. PATENT DOCUMENTS

| | | | |
|---|---|---|---|
| 3,522,482 | 8/1970 | Thompson | 361/91 |
| 3,769,572 | 10/1973 | Doubt | 361/18 |
| 3,900,784 | 8/1975 | Seike | 320/60 |
| 3,919,618 | 11/1975 | Coleman | 320/39 |
| 4,056,765 | 11/1977 | Schneidler et al. | 320/48 |
| 4,080,558 | 3/1978 | Sullivan | 320/48 |
| 4,220,905 | 6/1978 | Quarton | 320/39 |
| 4,316,133 | 2/1982 | Locke | 307/66 |
| 4,327,317 | 4/1982 | Heine et al. | 320/48 |
| 4,350,946 | 9/1982 | Prinsze | 320/48 |
| 4,553,561 | 1/1971 | Lesher | 320/39 |

*Primary Examiner*—William H. Beha, Jr.
*Attorney, Agent, or Firm*—Lowe, King, Price & Becker

[57] ABSTRACT

A hysteresis type battery charger includes a circuit for monitoring battery voltage and in response controlling a pass transistor to supply charging current to a battery. When the battery voltage is below a first predetermined value, high charging rate current is supplied to the battery; when the battery voltage is above a second predetermined value, the battery is supplied with trickle charging current. First and second light emitting diodes (LEDs) are selectively energized to indicate whether the battery is receiving high charging rate current or trickle charging current. The second LED is connected in circuit with the pass transistor to provide charging current foldback during excessive current demand, e.g., short circuit. The battery charger includes a low battery monitor that is energized when the expected battery lifetime is at a predetermined value, e.g., one hour. Temperature compensating networks, are provided whereby battery charging and low battery monitor operating characteristics are substantially temperature independent.

12 Claims, 5 Drawing Figures

HYSTERESIS TYPE BATTERY CHARGER HAVING OUTPUT SHORT CIRCUIT PROTECTION

TECHNICAL FIELD

The present invention relates generally to battery chargers and more particularly toward hysteresis type, multiple rate battery chargers having minimum component count.

BACKGROUND ART

Early battery chargers have comprised a voltage converter circuit that converts alternating current obtained from the commercial power lines to direct current which is applied, at a controlled rate, to a discharged battery to charge the battery to "full charge." To then maintain the battery fully charged, the magnitude of charging current is reduced to a "trickle charge" level which is just enough to compensate for charge loss during battery storage. Typical values for charging current and trickle current in amperes are, respectively, 10 percent and 1 percent of the numerical battery rating in ampere-hours.

To automatically switch between high rate charging and trickle charging modes of operation, later developed battery chargers have been provided with voltage monitors that monitor battery voltage and control a semiconductor pass device, such as a power transistor or silicon-controlled rectifier (SCR) to supply high rate charging current to the battery when the battery is at less than full charge and to thereafter trickle charge the battery to maintain the battery at full charge. Examples of multiple rate battery chargers of this type are shown in Coleman et al. U.S. Pat. Nos. 3,919,618 and Seike 3,900,784.

To prevent high repetition rate cycling of the charger between high and low charging rate levels, hysteresis is typically incorporated into the control strategy of the battery charger. The term "hysteresis" refers to a two-level switching characteristic, wherein the battery voltage at which high charging rate current is terminated when battery voltage is rising is higher than the voltage at which the high charging rate current is resumed when battery voltage is decreasing. Hysteresis is typically established by providing a non-linear element as a threshold reference voltage, as in the Coleman et al patent, or by providing positive feedback within the battery voltage monitor, as in the Seike patent.

To indicate to the user the state of charge of a battery, it is helpful to display the charging mode of the operation of the battery charger, i.e., whether the battery is receiving high charging rate current or trickle charging current. Such a display circuit is disclosed in Lesher U.S. Pat. No. 3,553,561 wherein incandescent lamps are energized depending upon charging mode.

In applications wherein battery charging is to be performed at different ambient temperatures, temperature compensation networks must be provided in the battery charger circuitry to make the charging characteristics temperature independent. A problem is designing such temperature compensation networks is that charge and discharge characteristics of a typical storage (rechargable) battery vary as a function of ambient temperature. Thus, relatively complex networks must be tailored to control battery charging current as a function of temperature.

Another characteristic of battery chargers in the prior art is that automatic switchover between commercial power line operation and battery operation of the load is provided depending upon whether the power line is available as a voltage source. Thus, when the power line source is available to energize a load, the battery is electrically isolated from the load. When the power line source is removed, however, the battery is automatically connected to the load as an emergency or backup energy source to energize the load. Prior art chargers of this type, however, supply either full line voltage or full battery voltage to the load; there is no sharing by the load of both power sources. During periods of brown-out, wherein the line voltage is at a voltage level less than the rated voltage level (e.g., 110-120 v.a.c.), it is desirable to supply only as much battery current to the load as is required to compensate for the decrease in current available from the commercial power source during brown-out.

To provide short circuit protection, that is, to prevent damage to the battery charger circuitry during output short circuit or excessive charging current demand by, e.g., a battery having shorted cells, chargers are typically provided with a maximum charging current limiting network. In Seike, for example, the period of a charging current controlling multivibrator is established by a transistor that responds to the voltage drop across an output resistor. As the voltage across the resistor increases, the period of the multivibrator is reduced to compensate for excessive output current demand. Various other types of current limiting networks such as current foldback have been used in prior battery chargers to control the conductivity of power transistors or SCRs that supply charging current to the battery as a function of battery voltage.

Battery chargers of the above type tend to be relatively complex in view of the multiple requirements enumerated supra. For applications in commercial, industrial or research environments wherein cost is a significant factor, circuit complexity must be minimized. Furthermore, component count must be reduced to a minimum to improve circuit reliability. At the same time, circuit performance must be maintained as high as possible to maximize battery lifetime.

Accordingly, one object of the invention is to provide a new and improved battery charger circuit having the features indicated above while minimizing complexity and component count.

Another object is to provide a new and improved hysteresis type battery charger having an output circuit that is protected against output short circuit or excessive charging current demand.

Another object is to provide a new and improved battery charger having temperature compensation circuitry that enables charging current to track battery charging and discharging characteristics as a function of ambient temperature.

Another object is to provide a new and improved battery charger having display elements to indicate battery charging mode of operation, i.e., high rate charging mode and trickle charging mode operation.

Another object is to provide a new and improved battery charger having a display circuit that indicates when the battery to which the charger is connected has a predetermined remaining lifetime, e.g., one hour of operation.

Another object is to provide a new and improved battery charger having a graduated output transition between commercial line operation and battery operation.

DISCLOSURE OF INVENTION

A battery charger, in accordance with the invention, comprises a battery voltage monitoring circuit that compares the battery voltage with a reference voltage and in response controls a past means to supply either high charging rate current or trickle charging rate current to the battery. To display charging mode, i.e., whether the battery is receiving high charging rate current or trickle charging rate current, first and second light emitting diodes are selectively energized. The second light emitting diode, besides displaying trickle charging mode operation, is connected in circuit with the pass means to provide current foldback in response to output short circuit or excessive charging current demand.

A low battery display circuit monitors battery voltage and energizes a display when the estimated remaining battery lifetime is at a predetermined value, e.g., one hour. Temperature compensation networks connected in circuit with the battery charger and low battery monitor display circuit provide temperature tracking of battery charging and discharging characteristics whereby circuit operation is ambient temperature independent.

A diode network connected between the battery, charger and load establishes gradual current sharing of the load between the battery and commercial power source. Thus, during brown-out, only enough current is supplied by the battery to the load to compensate for reduced current contribution to the load by reduced commercial line voltage.

Still other objects and advantages of the present invention will become readily apparent to those skilled in the art from the following detailed description, wherein we have shown and described only the preferred embodiment of the invention, simply by way of illustration of the best mode contemplated by us of carrying out our invention. As will be realized, the invention is capable of different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
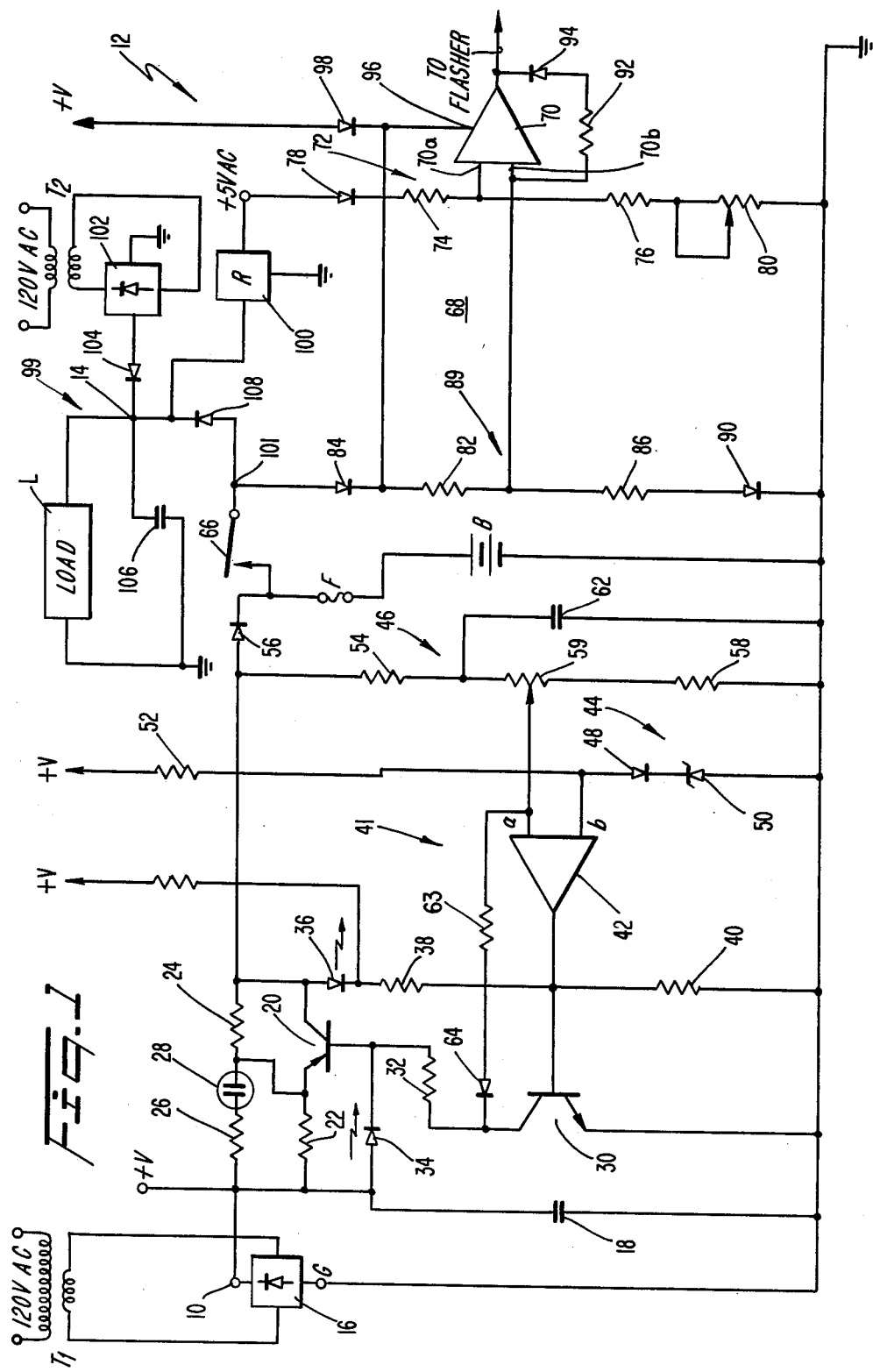
FIG. 1 is a circuit diagram of a battery charger constructed in accordance with the principles of the present invention.

As an overview, battery charger 12 (see FIG. 1) comprises a battery voltage monitor 41 that uses a resistance divider network 46 to measure battery voltage and compares battery voltage with a reference voltage developed by a reference source 44. The output of the monitor 41 through driver transistor 30 controls the conductivity of a series pass transistor 20 to supply either high charging rate current (transistor 20 "on") to battery B or trickle charging current (transistor 20 "off") to the battery. Light emitting diodes (LEDs) 34, 36 are controlled to display operating mode, i.e., high charging rate or trickle charging mode operation and LED 36 also provides charging current foldback for output short circuit protection. A "low battery" voltage display circuit 68 energizes an external display in response to battery voltage when remaining battery lifetime is one hour or other predetermined time period. Temperature compensation networks 44, 89 provide temperature tracking of battery voltage by the charger and low voltage display circuit. Current to load L is provided by battery B and commercial line on a shared basis depending upon relative voltage magnitudes therebetween through diode steering network 99.

Referring to FIG. 1 in more detail, commercial line voltage (e.g., 110–120 v.a.c.) is applied to the input terminal 10 of battery charger 12 in accordance with the invention through a first step down transformer $T_1$. Commercial line voltage is also applied to output terminal 14 through a second step down transformer $T_2$. The transformers $T_1$ and $T_2$ may be formed of a single transformer of a conventional type having a single primary winding and two stepped down secondary windings, if desired. The output of transformer $T_1$ supplies operating voltage to the battery charger 12, whereas the output of transformer $T_2$ supplies voltage to load L which may be a laboratory instrument such as a voltmeter, for example.

During normal operation, load L is energized by line voltage obtained from transformer $T_2$. When no line voltage is available from transformer $T_2$, i.e., when the load is "unplugged," the load is energized by battery B. During brown-out, i.e., when commercial line voltage is less than the rated line voltage, there is load voltage sharing between the battery and line, as described in detail below.

The output of transformer $T_1$ is supplied to a conventional full wave rectifier bridge 16 having outputs connected, respectively, to circuit input terminal 10 and ground G. Full wave rectified AC voltage, which may be, for example, on the order of 10 volts rms (assuming that the battery B is a 6 volt nominal battery) is filtered by an electrolytic capacitor 18 to provide an unregulated, filtered voltage source +V.

The output of filter capacitor 18 is supplied to the emitter of a grounded base transistor 20. A resistor 22 is connected in the emitter circuit of transistor 20 and the emitter-collector terminals are bypassed by a resistor 24. Resistor 22 is shunted by resistor 26 and neon lamp 28; the neon lamp 28 is energized to indicate that the battery charger 12 is "on."

Driver transistor 30 is connected at the base of pass transistor 20 through a resistor 32. The first light emitting diode (LED) 34 is connected between the filter capacitor 18 and the base of pass transistor 20. The second LED 36 is connected between the collector of pass transistor 20 and the base of driver transistor 30 through a resistor 38. As described below in detail, the first LED 34 is energized during high rate charging of the battery B whereas the second LED 36 is energized during trickle charging of the battery. The two LEDs 34 and 36 thus function as battery charger operating mode displays.

The base of drive transistor 30 is connected to ground through a resistor 40 and to the output of a comparator 42. One input of comparator 42 is connected to reference voltage source 44 and the second input is connected to resistance type voltage divider 46.

The reference voltage source 44 comprises a diode 48 connected in series with a precision diode 50 forming a conventional band gap regulator. The reference 44 is current biased by voltage source +V through resistor 52.

The voltage divider 46 comprises a first resistor 54 connected to the anode of an output diode 56 and a second resistor 58 connected to ground. A potentiometer 59 is connected between the first and second resistors 54 and 58; the input to comparator 42 is obtained from the wiper terminal of the potentiometer.

A capacitor 62 connected between the junction of resistors 54, 59 and ground stabilizes the voltage applied to the comparator 42 and bypasses noise and spurious signals to ground. A resistor 63 and a diode 64 are connected between one input of comparator 42 connected to potentiometer 59 and the collector of driver transistor 30 to provide switching point hysteresis in level detector 41, as described below. The load L is selectively isolated from battery B through a switch 66. Thus, when it is desired to apply battery power to load L as a backup to line power or when it is desired to power the load exclusively from battery B, switch 66 is closed.

Figure 2:
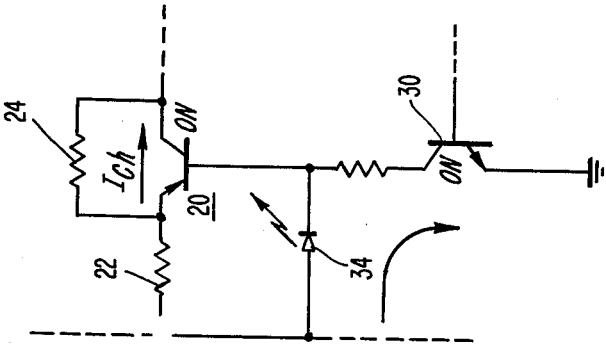
FIG. 2 is a partial circuit diagram illustrating the high charging rate current mode of operation of the circuit shown in FIG. 1.

In operation, assuming that switch 66 is open, and battery B is discharged, the voltage applied to comparator input 42a at potentiometer 59 is less than the reference voltage applied to comparator input 42b at reference voltage source 44. In response, the output of comparator 42 is high (approximately +V) to turn on driver transistor 30 and thereby conduct current in the base circuit of pass transistor 20. Referring to FIG. 2, with pass transistor 20 turned on, current $I_{ch}$ is conducted from input terminal 10 to battery B through resistor 22, transistor 20 and diode 56. The magnitude of this current is relatively high (on the order of 160 mv. where battery B is a 6 volt, 2.5 ampere-hour lead acid cell) and is termed "high charging rate current." Current also flows through LED 34 and driver transistor 30 to ground, thereby energizing the LED to indicate that the charger is operating in a high battery charging rate mode. No current flows through LED 36 since the output of the comparator 42 is high maintains the LED off.

Figure 3:
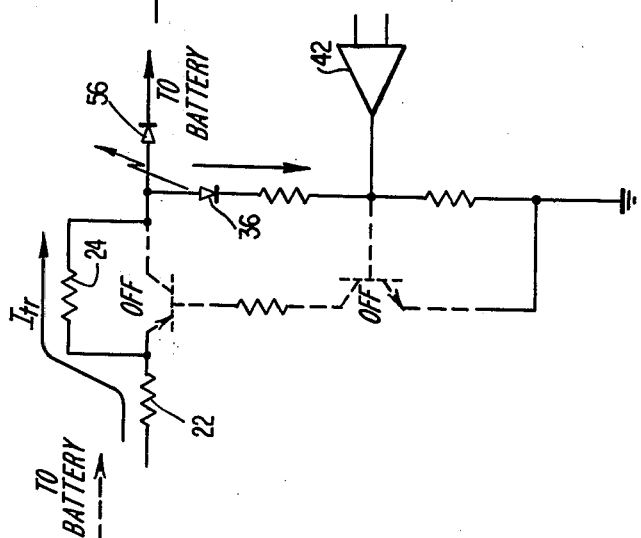
FIG. 3 is a partial circuit diagram illustrating the trickle charging mode of operation of the circuit shown in FIG. 1.

Assuming now that with switch 66 still open, the battery B has become fully or nearly fully charged, whereby the voltage at the wiper of potentiometer 59 applied to comparator 42 is above the reference voltage developed by reference voltage source 44. In response, the output of comparator 42 switches low (ground potential) to turn off driver transistor 30 and thereby turn off pass transistor 20. Referring to FIG. 3, trickle current $I_{tr}$ now flows between input terminal 10 and the battery B through resistor 22, resistor 24 and diode 56. The trickle charge current is relatively small, e.g., typically on the order of six milliamperes for the exemplary 6 volt, 2 ampere-hour battery B, since the difference between the voltage at terminal 10 and the battery voltage is relatively small. Still referring to FIG. 3, LED 36 is energized by current flowing from input terminal 10 to the output of comparator 42 which operates as a current sink. Energization of the second LED 36 indicates that the battery charger 12 is operating in a trickle charging mode.

Thus, battery voltage monitor 41 controls pass transistor 20 to supply high charging rate current to battery B when the battery voltage is below a predetermined voltage established by reference source 44 and to supply trickle charging current to the battery when the battery voltage is above the reference voltage indicating substantially full charge.

Resistor 62 and diode 64 connected between the collector of transistor 30 and comparator 42 provide switching point hysteresis, as defined supra. In practice, for the exemplary 6 volt, 2 ampere-hour battery, the upper and lower switching points of comparator 42 are respectively 6.95 volts and 7.45 volts of battery voltage; there is a 0.5 volt hysteresis or "band gap." This positive feedback loop prevents the battery charger 12 from cycling at a high repetition rate between high current rate charging and trickle charging. The size of the band gap, i.e., the "battery charge window," is determined by the size of resistor 62. The lower voltage of the battery charge window is determined by the position of the wiper of potentiometer 59. The control strategy provided by voltage monitor 41 and pass transistor 20 is termed "two step constant current charging," since grounded base pass transistor 20 operates as a constant current source.

The reference voltage source 44 has a temperature coefficient of voltage that tracks with the temperature coefficient voltage of battery B. The temperature coefficient of voltage of silicon diode 48 is approximately −2 millivolts per degree centigrade, whereas the temperature coefficient of voltage of the band gap regulator diode 50 is substantially zero. The temperature coefficient voltage of the exemplary battery B is approximately −8 millivolts per degree centigrade. In practice, the position of the wiper of potentiometer 59 is arranged such that the ratio of the resistance above the wiper relative to the resistor of the potentiometer below the wiper is approximately 4:1. Thus, the reference voltage of source 44 reflected to the battery B through divider 60 has an effective temperature coefficient of voltage that is multiplied by the divider ratio of 4:1, whereby the reference voltage effectively tracks the battery voltage as a function of temperature. This principal is obviously applicable to other battery types.

Figure 4:
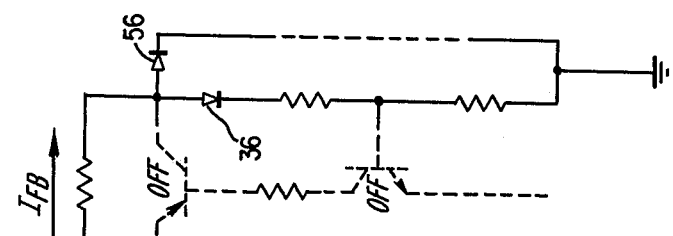
FIG. 4 is a partial circuit diagram illustrating the current foldback mode of operation of the circuit shown in FIG. 1.

In the event that the output of charger 12 at the cathode of diode 56 is short circuited to ground or there is excessive charging current demand caused by, for example, shorted cells in battery B, the second LED 36 connected in circuit with pass transistor 20 turns the pass transistor 20 off and thereby effectively "folds back" the charging current to a relatively low value determined by the resistance of resistors 22 and 24. With reference to FIG. 4, assuming that the cathode of output diode 56 is short circuited to ground or pulled down to a low, non-zero voltage, the voltage at the anode of LED 36 will be equal to the output voltage at battery B plus the diode drop voltage across output diode 56. Since the output voltage is substantially at ground potential, LED 36 is not forward biased and no base current is supplied through the LED to the base of driver transistor 30 independently of the output state of comparator 32. In practice, the magnitude of foldback current, determined by the difference between the input voltage at terminal 10 and the battery voltage together with the values of resistors 22, 24 is about 15 mv. Foldback current is greater than trickle current because in foldback mode operation, output voltage is less than battery discharge voltage. The foldback current is, however, substantially less than high charging rate current.

In practice, the foldback control operating mode of the circuit, shown in FIG. 4, will not become operative during normal battery operation since even fully discharged batteries will quickly charge to a value high enough to cause sufficient base current to be supplied to driver transistor 30 to turn on pass transistor 20.

Thus, of particular significance, the LED 36, besides functioning as a trickle charging current operating mode display, also electrically isolates the base of drive transistor 30 during output short circuit to provide current foldback, thereby minimizing component count.

Referring again to FIG. 1, low battery monitor circuit 68 comprises a second comparator 70 having one input 70a responsive to a second reference voltage source 72 and a second input 70b responsive to battery voltage B through a second resistor divider 89. The reference voltage source 72 comprises a first resistor 74 connected to the output of a voltage regulator 100 through a first diode 78 and a second resistor 76 connected to ground through a potentiometer 80. The second input 70b to the comparator 70 is connected to monitor battery voltage through the divider 89 comprising resistor 82 and diode 84 connected to battery B and to ground through resistor 86 and diode 90. Switching point hysteresis in the comparator 70 is provided by feedback resistor 92 and diode 94. The output of the comparator 70 is connected to an external flasher network (not shown) that flashes a display on and off to indicate low battery voltage. The comparator 70 is enabled by source voltage +V applied to an enable terminal 96 through a diode 98.

The reference voltage source 72 for low battery voltage monitor 68 is obtained from a +5 volt regulated voltage developed by the voltage regulator 100 which receives an unregulated input voltage from output terminal 14. The voltage applied to comparator input 70a at the junction of resistors 74, 76 is controlled by potentiometer 80 in relation to a predetermined percentage of battery voltage corresponding to one hour (or other predetermined time period) of remaining battery lifetime.

The resistors 82, 86 from which battery voltage is applied to comparator input 70b have values selected in relation to the resistors in reference source 72. In practice, resistors 82, 86, 74 and 76 have equal values. Potentiometer 80 is calibrated by applying a calibration voltage to terminal 101 having a magnitude corresponding to that of a one hour period (or other period) to end of life. Potentiometer 80 is now adjusted to obtain a signal from the output of comparator 70. The comparator 70 is energized alternatively from the battery B as a power supply through diode 84 and from the commercial power line through diode 98. Diode 84 also steers current from the battery B through resistor 82 to comparator 70, with the remaining input of the comparator 70 receiving current from regulator 100 through steering diode 78. Diodes 84 and 78 temperature track each other to eliminate voltage mismatch at the two inputs of the comparator 70 as a function of ambient temperature.

Diode 90 connected in divider circuit 89 has a negative temperature coefficient of voltage that is selected to track the battery voltage as a function of temperature to cause the low time warning of voltage detector 68 to be substantially temperature independent.

The output of battery charger 12 at terminal 14 is controlled, in accordance with the invention, to supply current to load L from the battery B and from the commercial power line in a shared manner, that is, to supply the load with battery current in the absence of line power, to supply the load with line power in the absence of battery power and to supplement line current with battery current during brownout periods, i.e., periods wherein the commercial line voltage is less than rated line voltage.

Thus, in accordance with another aspect of the invention, the output of step down transformer $T_2$ is supplied to the input terminals of a full wave bridge 102. The output of the bridge 102 is supplied through a first diode 104 to the load L and a filter capacitor 106. Also connected to the load L is a second diode 108, which is preferably a Schottky diode, connected at the output of switch 66. Thus, the diodes 104 and 108 have cathodes connected together at output terminal 14. Output terminal 14 is also connected to the input of 5 volt regulator 100.

Figure 5:
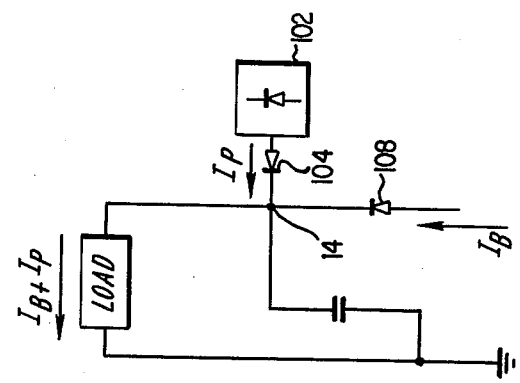
FIG. 5 is a partial circuit diagram illustrating load sharing of the battery and line power source.

The operation of the diode network 104, 108 is best understood with reference to FIG. 5, wherein it is assumed that switch 66 is closed to supply battery current to load L and there is no line voltage, i.e., the apparatus is "unplugged." The voltage applied to load L is equal to the battery voltage minus the voltage drop across diode 108 (about 0.2 vt for a Schottky diode), with diode 104 reverse biased. If line voltage is applied to the bridge 102, however, and the magnitude of the line voltage at output terminal 14 is greater than battery voltage, the voltage applied to load L is equal to the line voltage at the output of bridge 102 minus a voltage drop across diode 104, with diode 108 reverse biased. If, on the other hand, both battery voltage and line voltage are applied to output terminal 14, i.e., the apparatus is "plugged in" and switch 66 is closed to apply the battery B to the load L, diode 108 is forward biased whenever the battery voltage is greater than the stepped down line voltage at the output of diode 104, and both diodes 104 and 108 conduct current. The amount of current supplied from battery B to load L is a function of the difference between battery voltage and the stepped down, rectified line voltage at output terminal 14. Thus, the current contribution to load L by battery B varies gradually as a function of line voltage between zero current contribution and full current contribution; in practice, the battery B is controlled to begin to contribute current to load L when commercial line voltage drops below about 70 volts.

In this disclosure there is shown and described only the preferred embodiment of the invention, but as aforementioned, it is to be understood that the invention is capable of use in various other combinations and environments and is capable of changes or modifications within the scope of the inventive concept as expressed therein.

We claim:
1. A storage battery charging apparatus comprising:
 an input terminal to be connected to a source of electrical energy;
 an output terminal to be connected to a storage battery;
 first means including a resistance divider circuit for monitoring a voltage applied to said output terminal by said battery;

a first reference voltage source;

comparator means responsive to said first reference voltage source and said battery voltage monitoring means for generating a comparison signal;

pass means connected between said input and output terminals and responsive to said comparison signal for applying a high charging rate current to the storage battery when the battery voltage measured by said monitoring means is below a first predetermined value and for supplying a trickle charging current to said storage battery when the battery voltage measured by said monitoring means is above a second predetermined value;

first and second light emitting diodes (LEDs);

first means responsive to said high charging rate current for energizing said first LED to display a high charging rate mode of operation;

second means responsive to said trickle charging rate current for energizing said second LED to display a trickle charging rate mode of operation;

current foldback control means for limiting the magnitude of charging current applied to said output terminal during excessive charging current demand, e.g., output short circuit, to less than that of said high charging rate current, said current foldback control means including said second LED connected in circuit with said pass means for reducing conductivity of said pass means during said excessive current demand.

2. A storage battery charging apparatus, comprising:

an input terminal to be connected to a source of electrical energy;

an output terminal to be connected to a storage battery;

first means for monitoring battery voltage;

pass means connected between said input and output terminals for supplying charging current to said battery selectively at a high charging rate in response to a relatively low monitored battery voltage and a substantially lower, trickle charging rate in response to a monitored battery voltage corresponding generally to a fully charged condition;

a first display comprising a first light emitting diode (LED) energized during high current rate charging of said battery;

a second display comprising a second LED energized during trickle current rate charging of said battery; and current foldback means for limiting the magnitude of charging current applied to said output terminal to less than that of said high charging rate current in response to excessive charging current demand, e.g., output short circuit, said current foldback means including said second LED connected to reduce conductivity of said pass means during said excessive current demand.

3. The apparatus of claim 2, wherein said first battery voltage monitoring means includes a voltage comparator means, a divider circuit responsive to said battery voltage and a first reference voltage source, said comparator means being responsive to said divider circuit and said first voltage reference source to generate a comparison signal.

4. The apparatus of claim 1 or 3, wherein said pass means includes a pass transistor and a drive transistor connected in a base circuit of said pass transistor, said driver transistor being controlled by said comparison signal to selectively turn said pass transistor on to provide high charging rate mode operation and off to provide trickle charging rate mode operation, a bypass resistor being connected across said pass transistor to establish said trickle charge current.

5. The apparatus of claim 1 or 3, wherein said reference voltage source has a temperature coefficient of voltage corresponding to a temperature coefficient of voltage of said battery.

6. The apparatus of claim 5, wherein said temperature coefficient of said reference voltage source is established relative to that of said battery in correspondence to a resistance ratio of said divider circuit of said first battery voltage monitoring means.

7. The apparatus of claim 1 or 3, wherein said comparator means includes positive feedback means to establish a switching voltage level hysteresis.

8. The apparatus of claim 1 or 3, wherein said divider circuit includes a potentiometer for controlling voltage applied by said divider circuit to said comparator means.

9. The apparatus of claim 1 or 2, including a low battery display means for identifying a predetermined remaining battery lifetime, second means for monitoring said battery voltage, a second reference voltage source, second means for comparing the battery voltage monitored by said second means with a second reference voltage derived from said second reference voltage source and means responsive to said second comparing means for energizing said low battery display means.

10. The apparatus of claim 9, wherein said second monitoring means includes temperature compensation means for controlling said second reference voltage to track said battery voltage as a function of temperature.

11. The apparatus of claim 10, wherein said second monitoring means includes positive feedback means for establishing a switching voltage level hysteresis.

12. The apparatus of claim 1 or 2, including diode means at said output terminal for electrically isolating said battery from a load when the voltage of said power source applied to said input terminal has at least a predetermined magnitude, and for controlling magnitude of battery current flow to said load gradually as a function of said power source voltage when said power voltage is below said predetermined magnitude.

* * * * *

UNITED STATES PATENT AND TRADEMARK OFFICE
CERTIFICATE OF CORRECTION

PATENT NO. : 4,386,308
DATED : May 31, 1983
INVENTOR(S) : Philip Emile, Jr. et al It is certified that error appears in the above-identified patent and that said Letters Patent are hereby corrected as shown below:

Column 6, line 11, "62" should read — 63 —.

Column 6, line 22, "62" should read — 63 —.

Column 6, line 65, "32" should read — 42 —.

Signed and Sealed this

Thirteenth Day of September 1983

[SEAL]

Attest:

GERALD J. MOSSINGHOFF

Attesting Officer

Commissioner of Patents and Trademarks